United States Patent [19]

Hale et al.

[11] Patent Number: 5,555,813
[45] Date of Patent: Sep. 17, 1996

[54] PERMANMENT HEAT ACTIVATED ELECTROGRAPHIC PRINTING PROCESS AND COMPOSITION

[75] Inventors: Nathan Hale; Ming Xu, both of Mt. Pleasant, S.C.

[73] Assignee: Sawgrass Systems, Inc., Mt. Pleasant, S.C.

[21] Appl. No.: 372,520

[22] Filed: Jan. 13, 1995

(Under 37 CFR 1.47)

Related U.S. Application Data

[63] Continuation-in-part of Ser. No. 299,736, Sep. 1, 1994, Pat. No. 5,488,907, which is a continuation-in-part of Ser. No. 195,851, Feb. 10, 1994, Pat. No. 5,431,501, which is a continuation-in-part of Ser. No. 724,610, Jul. 2, 1991, Pat. No. 5,302,223, which is a continuation-in-part of Ser. No. 549,600, Jul. 9, 1990, abandoned.

[51] Int. Cl.$^6$ ........................................................ B41F 1/16
[52] U.S. Cl. ........................................... 101/492; 101/488
[58] Field of Search ................... 400/120.02; 346/76 PH; 347/114; 101/487, 488, 492

[56] References Cited

U.S. PATENT DOCUMENTS

| | | | |
|---|---|---|---|
| 4,251,611 | 2/1981 | Mehl et al. | 430/42 |
| 4,656,966 | 4/1987 | Guistina | 430/119 |
| 4,758,952 | 7/1988 | Harris, Jr. et al. | 364/300 |
| 4,943,509 | 7/1990 | Sakai et al. | 430/138 |

FOREIGN PATENT DOCUMENTS

| | | |
|---|---|---|
| 0351794 | 1/1990 | European Pat. Off. . |
| 2095855 | 10/1982 | United Kingdom . |
| 2189436 | 10/1987 | United Kingdom . |

*Primary Examiner*—Ren Yan
*Attorney, Agent, or Firm*—B. Craig Killough

[57] ABSTRACT

An image is printed on a medium by means of an electrographic device using an ink composition comprising heat activated inks, without substantial activation of the inks during the process of printing the image onto the medium. A molecular sieve added to the ink composition assists activation control. The image is transferred from the medium to the object on which the image is to permanently appear by applying sufficient heat and pressure to the medium to activate and permanently transfer the inks from the medium to an object.

8 Claims, 2 Drawing Sheets

PERMANMENT HEAT ACTIVATED ELECTROGRAPHIC PRINTING PROCESS AND COMPOSITION

This application is a continuation in part of application Ser. No. 08/299,736, filed Sep. 1, 1994, now U.S. Pat. No. 5,488,987, which is a continuation in part of application Ser. No. 08/195,851, filed Feb. 10, 1994, now U.S. Pat. No. 5,431,501, which is a continuation in part of application Ser. No. 07/724,610, filed Jul. 2, 1991 U.S. Pat. No. 5,302,223, which is a continuation in part of application Ser. No. 07/549,600, filed Jul. 9, 1990, now abandoned.

FIELD OF THE INVENTION

This invention relates to printing generally, and is more specifically directed to a method of printing heat activated inks by means of an electrographic device onto paper or other printable substrate as a medium, and subsequently heat activating the ink, thereby transferring the design formed by the ink from the medium to a second substrate on which the design is to permanently appear.

BACKGROUND OF THE INVENTION

Words and designs are frequently printed onto clothing, other textile materials, and other objects. Common means of applying such designs to objects include the use of silk screens, and mechanically bonded thermal transfers.

The use of computer technology allows substantially instantaneous printing of images. For example, video cameras or scanning may be used to capture an image and input the image into a computer. The image may then be printed from the computer by any suitable printing means, including mechanical thermal printers, ink jet printers and laser printers. These printers will print in multiple colors.

Color electrographic devices, such as laser printers and photocopiers, are in common use. These devices use combinations of cyan, yellow and magenta inks or dyes to produce multi-color images. These devices use inks in the form of dry toners or developers. These devices incorporate means for fusing the printed ink or dye to the substrate, which is usually paper. The fusing means incorporates heat, or heat and pressure.

Sublimation inks have been used with laser printers and copiers to produce color images on the receptor sheet printed by the printer or copier, whereby sublimation or activation of the ink or dye occurs at the time of printing or fusing of the image onto the receptor by the printer or copier. The sublimation dyes used are low energy, that is, they require low amounts of heat to activate, so that activation is achieved during the very short image fixing time provided by conventional laser printers and copiers. The receptor must be coated, or otherwise include, a polymer or polyester component. Toners comprising sublimable dyes and a polyester core which are encapsulated in a waxy compound to improve storage stability are disclosed in Japanese application serial number 85-171830.

Sublimation inks have been printed by electrographic devices in the prior art in monochromatic form, without activating the inks as they are printed onto the substrate. Multiple colors are printed by such processes by multiple aplications of monochromatic process. These processes are not full process color which can be used with color laser printers, color copiers or other full color electrographic process. The prior art has encountered problems related to dye layer build up, registration, and color contamination in trying to print sublimation inks in a non-activated form from known color electrographic devices.

Heat activated transfer inks, such as sublimation inks, change to a gas upon the apllication of heat, and have a high affinity for polyester at the activation temperature and a limited affinity for most other materials. Once the gassification bonding takes place, the ink is permanently printed, and is highly resistant to change or fading caused by environmental exposure, such as to light, or exposure to certain common chemical processes, such as cleaners or laundry products.

Hale, U.S. Pat. Nos. 5,246,518, 5,248,363 and 5,302,223, disclose the use of thermal printers to produce an image on a medium or transfer sheet wherein the image is comprised of sublimation or other heat activated inks. The method described in Hale does not activate the ink during the printing of the medium or transfer sheet.

The process of printing heat sensitive or activated inks such as sublimation inks by means of a laser printer is similar to the process described in Hale, U.S. Pat. Nos. 5,246,518, 5,248,363 and 5,302,223. The use of heat by electrographic devices such as laser printers and photocopiers presents the problem recognized in the Hale patents of printing heat activated inks in a non activated form by means of such devicess. Laser printers and photocopiers in common use employ relatively high temperature fuser devices to thermally fuse or bind the ink to the substrate, since these devices anticipate that the image will be permanently bonded to the substrate which is printed by the device, and do not anticipate a subsequent thermal transfer of the printed image from the substrate.

SUMMARY OF THE PRESENT INVENTION

The present invention is a method of printing heat activated inks or dyes in a non activated form onto a medium in a desired image by means of an laser printer, for subsequent transfer of the image from the medium by heat activation of the inks. The invention includes ink or dye compositions comprising heat activated inks or dyes for use with the method.

The inks are printed in the desired design by means of an electrographic device onto a substrate, which acts as a medium. The substrate may be paper, or it may be other material which is printable by the electrographic process used by conventional laser printers and copiers.

Electrographic devices incorporate a thermal process, but the heat activated inks or dyes of the invention are not substantially activated at the operational temperatures of the device. Heat activation of the inks does not take place at the time of printing of the image by the printer or copier, but rather, takes place at the time of the transfer of the image from the medium to the substrate on which the image is permanently applied. The non activated inks produce a printed image on the medium which is recognizable, but the colors are dull and are not acceptable for most applications.

To prevent substantial sublimation of the heat activated inks or dyes during the thermal process of printing by the laser printer or copier, a molecular sieve is incorporated into the dry toner which comprises the dye. The molecular sieve material entraps the dye or ink molecules and helps to prevent sublimation of a substantial portion of the dye molecules at the temperatures at which the laser printer or copier operates. After the image is printed onto the substrate medium by the electrographic device, sufficient heat is applied to the substrate to transfer the image from the medium to the second substrate on which the image is to permanently appear. The application of sufficient heat activates, or sublimates, the inks during this transfer from the medium to the substrate. The image is then permanently bonded to the substrate. The permanent image is sharp, with vivid colors forming the image.

DETAILED DESCRIPTION OF THE PREFERRED EMBODIMENT

Figure 1:
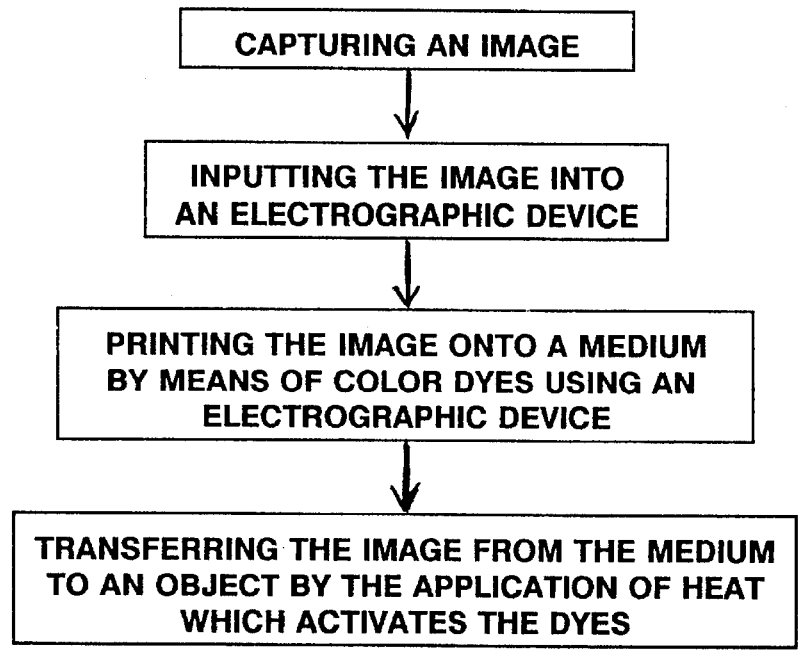
FIG. 1 is a block diagram showing the printing process.
Figure 2:
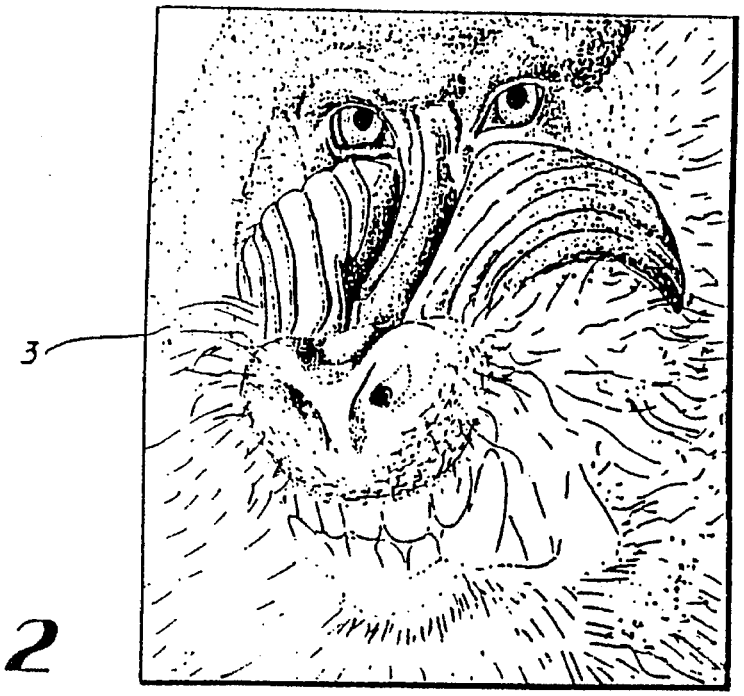
FIG. 2 illustrates an example of a design printed by a printer using the printing process.
Figure 3:
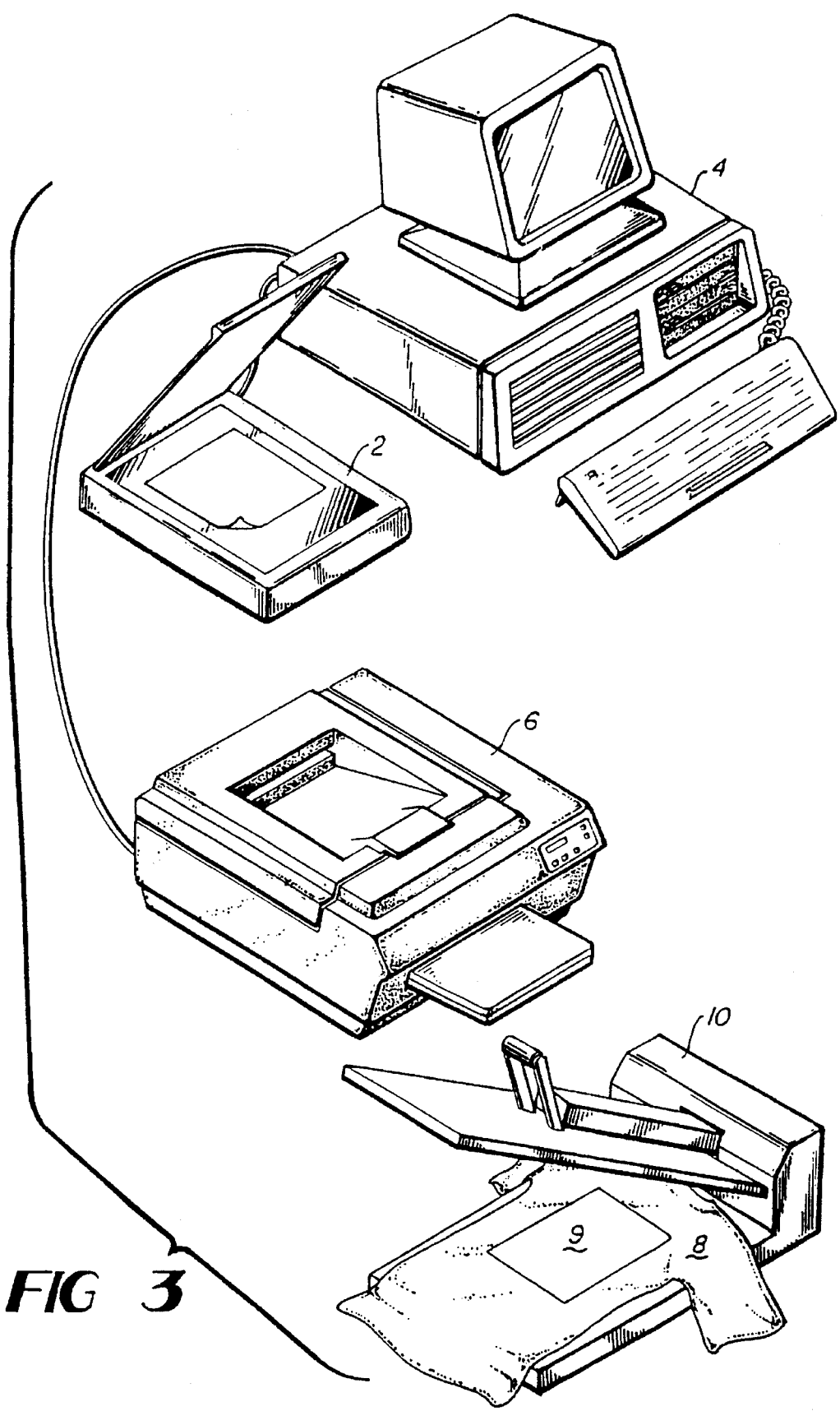
FIG. 3 is a diagrammatic illustration showing exemplary elements of computer and printing systems which could be used to achieve the printing process.

In the preferred embodiment, a video camera or scanning device 2 is used to capture an image 3. The image is then input into a computer 4. The computer directs an electrographic device such as a laser printer 6 or photo copier to print the image. Any means of forming an image which may be printed from a computer may be used, including images generated by software. Available computer design graphic software may be used, or still photography may be used. The design may be photographic, graphic artistic, or simply letters or words. The use of cyan, yellow and magenta ink compositions allow the printer to print in full color or multi-color designs.

In the present invention, heat activated inks or dyes are used, and are transferred to a medium by the electrographic device without activating the inks. The heat activated inks are transferred onto the medium by the printer.

Virtually any material which can be printed upon by a conventional electrographic device, such as a laser printer or photo copier, and which will withstand the transfer temperature of approximately 330°–400° F., as described herein, may be used as a medium. This medium may be any paper commonly used with color laser printers or copiers, however, standard bond paper may be used, or even a sheet of metal, if the metal can be handled by the printer. The exception is receiver substrates having a high content of polyester or EVA on the surface.

Once the image is printed onto the medium, the image may be immediately and permanently transferred onto the substrate, or the image may be transferred from the medium to the substrate at a later time. The design may be transferred onto a textile substrate, such as a shirt 8, or onto other substrates, such as metal, ceramic, wood, or plastic. The design 3, which is printed onto the medium without substantially activating the inks which comprise the design, is placed against the object 8. A temperature which is sufficient to activate the inks is then applied. This temperature will typically be around 400° F., but is selected according to the sublimation properties of the inks or dyes used to print the image onto the medium. This temperature is applied for a time sufficient to heat activate and transfer the inks. A heat transfer machine 10 may be used to accomplish the transfer of the inks from the medium to the substrate. Substantial activation, or sublimation, does not take place at the time of printing the image onto the medium, even though heat may be used to accomplish the printing of the image onto the medium, but occurs during the transfer from the medium to the substrate.

Zeolites are molecular sieves having three-dimensional network structures. Depending on the composition and structure, molecular sieve products have different cavity sizes and window opening sizes. Zeolite A is a tetrahedral structure grouped to form a truncated octahedron with a silica or alumina tetrahedron at each point, network cavities of 11.5 A in size, and window openings from 2.3 to 4.5 A. Zeolite A is characterized by the general chemical formula:

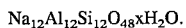

$Na_{12}Al_{12}Si_{12}O_{48}xH_2O$.

Zeolite X is characterized by a tetrahedral stacking of diamond structures, with six-membered oxygen atom rings, and window openings of 9–10 A in diameter which open into the interior of the three dimensional structure. Zeolite X is characterized by the general chemical formula:

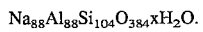

$Na_{88}Al_{88}Si_{104}O_{384}xH_2O$.

Molecular sieves having larger window openings than zeolite A may be used. These include zeolite X, zeolite Y, ZSM-11, SAPO-5 (7.3 A×7.3 A), Mordenite (12 O windows, 6.7 A×7.0 A), VPI-5 (aluminophosphate, 10 A window opening 12.3 A pore size).

These molecular sieve products have relatively large surface area per unit volume and allow partial to complete entrapment of the sublimation dye molecules into their three-dimensional structure, thereby inhibiting activation under relatively mild heat and pressure conditions provided by fusers of conventional laser printers or electrographic copiers. High quality multi-color or full color images can be produced by using molecular sieve products in the toner, with no fogging of the image. Molecular sieve products improve the resistance of the toner to the adverse effects of humidity, due to their vapor absorbency properties, and further improve the surface properties of the toner.

Small particles (0.1µ to 10µ) of the molecular sieve products are used to entrap sublimation dyes. As is detailed in the following Examples, the dye is placed into solution. The molecular sieve material is the added. The dye molecules enter the openings of the molecular sieve material, and are retained within the openings. The molecular sieve and dye are taken out of solution, such as by vacuum drying. The dried mixture is rinsed to eliminate excess dye which is not retained within the molecular sieve material, or which is not absorbed directly onto the surface of the molecular sieve material, and is then dried again.

The molecular sieve products and sublimation dyes may be combined with various additives and carrier materials to produce the desired toner according to the invention. The resulting toner composition may comprise 3 to 20% molecular sieve product by weight.

Binder polymers and/or charging control polymer materials may be incorporated into the toner. With conventional electrographic processes, a vivid color image is produced prior to or during the fixing stage of the printing or copying. Sufficient polyester or EVA is provided to improve the color image. However, such materials are excellent sublimation dye receivers, and in the present invention, will retard activation of the sublimation dyes during transfer of the image from the substrate medium to the second or final substrate, even when very high temperatures are applied for long periods to effect transfer.

In the present invention, it is preferred to use binder polymers with an average molecular weight of 3,000–500,000 and glass transition temperature ($T_g$) ranges from 50°–100° C., or melting temperature ($T_m$) ranges from 60°–200° C., with good fusing performance. Examples of such materials include homopolymer resins of soya-modified alkyd resins, modified phenolic resins, soya oil and linseed oil modified alkyds, methylphenol-formaldehyde, xylenol-formaldehyde; homopolymer of styrene and substituted styrene such as polystyrene, poly(p-chlorostyene), polyvinyltoluene; and styrene copolymers such as styrene-vinylnaphthalene copolymer, styrene-acrylonitrile copolymer, styrene-vinyl methyl ether copolymer, styrene ethyl ether copolymer, styrene vinyl methyl ketone copolymer, styrene-butadiene copolymer, styrene-isoprene copolymer, styrene-acrylonitrile-indene copolymer, styrene-maleic acid copolymer and styrene-maleate copolymer. Acceptable binders may include terpene resins, polyamide resins, polyvinyl chloride resins, aliphatic hydrocarbon resins, alicyclic hydrocarbon resins, aromatic petroleum resins, chlorinated paraffins and paraffin waxes. Generally, the toner composition will comprise about 50% to 90% of the binder materials.

Since dyes and binder polymers do not give either an adequate charge level or rate of charging, charge control additives and/or regulators are added into the toner composition of preferred embodiment of the present invention. Either positive charge control additives or negative control additives can be used as necessary to the application. Colored or colorless quaternary ammonium salts and onium charge control agents can be used as positive charge control additives and metal complexes, while acidified carbon blacks or fumed silica surface additives can be used as negative charge control additives. The toner may comprise 0.5% to 10% charging additives.

The present invention can be used in both single-component and two-component developers. Magnetite and carrier materials can be added depending on the specific application. In single-component applications, magnetite is added to enable the transport of the toner through the developer housing, and against the latent image, under magnetic control. The addition of magnetite also offers an advantage in two-component development, by controlling machine dirt even though the loading of such materials is much smaller than the single-component applications. The carrier provides basically two important functions in two-component toner: charge generation and transport through the developer housing. The carrier can be comprised of either magnetic or nonmagnetic materials. Typical nonmagnetic carriers include particles such as glass beads, crystals of inorganic salts in crystal forms of sodium or potassium chlorides, metal particles and hard resin particles, and similar materials. Magnetic carrier particles include ferromagnetic materials comprised of iron, cobalt, or nickel in the form of an alloy or a mixture, and with or without film-forming resin coatings to improve the toner triboelectrical properties of the particles.

EXAMPLE 1

5 parts Zeolite ZSM-11 (hydrogen form)[1]
[1]Mobil Chemicals 2 parts Intratherm Brilliant Blue P-309[2] as a dye material
[2]Crompton & Knowles Corporation The zeolite is ground into 20–50 micron diameter particles by, for example, a hammer mill, and then dried, for example, in a vacuum oven at 100° C. for 2 hours. The zeolite is then cooled to room temperature in a desiccator. The dye material is added into a mixture of 100 ml of 1-cyclohexyl-2-pyrolidinone and 400 ml of toluene, the solution is heated to 50° C., and agitated until all dye chemical is completely dissolved. The zeolite is added to the solution and maintained at 50° C. for 2 hours under agitation. The mixture is dried under a vacuum rotating dryer, and the remaining solvent is removed in a vacuum oven at 130° C./7 mm for 10 hours. A cyan dyestuff or ink composition suitable for use in a dry toner results.

EXAMPLE 2

5 parts Zeolite 13X (sodium form)[3]
[3]UOP 2 parts of Sublaprint Red 70011)[4] as a dye material
[4]Keystone Aniline, Corporation, USA The zeolite is ground into 20–50 micron diameter particles by, for example, a hammer mill, and dispersed into 0.05N HCl. The ion-exchange process continues for 12 hours under agitation at room temperature. The resulting H-form zeolite is filtered and rinsed in distilled water until the pH value is constant.

The zeolite 13X is dried in a vacuum at 100° C. for 5 hours, and cooled to room temperature in a desiccator. The dye material is added to a mixture of 50 ml of 1-cyclohexyl-2-pyrrolidinone, 100 Dimethylformamide and 300 ml of toluene, heated to 50° C. and agitated until the dye is completely dissolved. The zeolite is added to the solution while continuing to rotate the dryer under vacuum at 130° C./7 mm for 10 hours to the remove the remaining solvent. A magenta dyestuff or ink composition for use in a dry toner results.

EXAMPLE 3

50 parts Zeolite 13X (sodium form)[3]
[3]UOP 19 parts Sublaprint Yellow 70004[4] as a dye material The yellow dyestuff or ink composition of this example is prepared according to the method of Example 2, and is suitable for use in a dry toner.

An example of a dry toner or ink composition for use with the method of the present invention is prepared as follows:

80 parts of Poly($\alpha$-methylstyrene) ($T_g$ of 49° C., Softening point of 141° C.)[5]
[5]Scientific Polymer Products, Inc.

5 parts of Polywax 1000 ($T_m$ of 120° C.)[6]
[6]Petrolite Co.

1 part (3-lauramidopropyl)trimethylammonium methyl sulfate 15 parts dye stuff prepared according to Example 1, 2, or 3 above.

The toner is prepared by using a melt mixing technique in a roll mill, then cooling the mixture to room temperature. The materials are ground to an average particle size of 1 to 10 microns by, for example, a pulverizer in which an air jet mill is used.

Dry electrographic copier/printer toners produced by the above examples are mixed in a ratio of one part toner of the desired color to ten parts of a carrier iron powder (EFV 250/400)[7] to form developers in each of the desired colors.
[7]Nippon Teppun Co., Ltd.

A color laser printer using dry type toners, such as a QMS Magicolor, is supplied with the three colors of developers. The desired image is printed onto ordinary paper, which acts as a substrate medium. The cyan, magenta and yellow dyes will yield a full color image as instructed by the computer and printer, although the image which appears on the substrate medium is dull since the inks or dyes have not been activated.

The printer, as is chracteristic with electrographic devices, uses a fuser to fuse or bind the toner after it is printed on the substrate in the desired image by the application of heat. The heat is insufficient to activate a substantial portion of the dye due to the dye selected, the operational temperature of the fuser, and the engagement of the dye molecules within the molecular sieve material.

The full color image is subsequently transferred from the medium to a substrate comprising a polyester component, such as a textile, or a polymer coating, by the application of heat which is sufficient to sublimate the dye. For example, the transfer step may be accomplished in this example by the application of heat at 400° F., and the simultaneous application of pressure, for twenty (20) seconds. The relatively high heat applied causes the dye molecule to be released from the molecular sieve material due to increased molecular activity from the heat, whereupon activation of the dye occurs. The dye bonds to the second or permanent substrate to yield a full color image as desired which is permanently bonded.

The example formulations and applications are given by way of demonstration, and are not exhaustive of the application of heat activatied dyes and molecular sieves to accomplish the full color printing method of the present invention using dry toners and electrographic devices.

What is claimed is:

1. A method of printing an image by means of an electrographic device using heat activated dyes, comprising the steps of:
   a. preparing at least one ink composition comprising a heat activated dye and a molecular sieve;
   b. printing said ink composition by means of an electrographic device onto a medium to form an image on said medium, wherein said printing of said ink composition by said electrographic device is at a temperature which is below a temperature at which a substantial portion of said ink composition is activated;
   c. applying mechanical means to said image and binding said image to said medium without activating a substantial portion of said ink composition;
   d. removing said medium from said electrographic device; and
   e. transferring, at a location which is remote from said electrographic device said image from said medium onto a substrate on which the image is to appear by the application of heat to said medium at a temperature which is above the temperature at which said ink composition activates, so as to cause a substantial portion of said ink composition to activate, wherein said dye bonds to said substrate and said image is deposited onto said substrate from said medium and is bonded to said substrate.

2. A method of printing an image by means of an electrographic device using heat activated dyes as described in claim 1, wherein at least three ink compositions are prepared and each of said ink compositions comprises a heat activated dye which is of a different color than is present in each of the remaining ink compositions.

3. A method of printing an image by means of an electrographic device using heat activated dyes as described in claim 2, wherein said ink compositions so prepared are dry compositions.

4. A method of printing an image by means of an electrographic device using heat activated dyes as described in claim 1, wherein said ink composition so prepared is a dry composition.

5. A method of printing an image by means of an electrographic device using heat activated dyes, comprising the steps of:
   preparing at least one ink composition comprising a heat activated dye and a molecular sieve for shielding said heat activated dye;
   b. printing said ink composition by means of an electrographic device onto a medium to form an image on the medium, wherein said printing of said image by said electrographic device is at a temperature which is below a temperature at which a substantial portion of said heat activated dye within said ink composition is activated; and
   c. transferring said image from said medium onto a substrate on which the image is to appear by applying heat to said medium at a temperature which is above the temperature at which said ink composition activates, so as to cause a substantial portion of said ink composition to activate, wherein said dye bonds to said substrate and said image is deposited onto said substrate from said medium.

6. A method of printing an image by means of an electrographic device using heat activated dyes as described in claim 5, wherein at least three ink compositions are prepared and each of said ink compositions comprises a heat activated dye which is of a different color than is present in each of the remaining ink compositions.

7. A method of printing an image by means of an electrographic device using heat activated dyes as described in claim 6, wherein said ink compositions so prepared are dry compositions.

8. A method of printing an image by means of an electrographic device using heat activated dyes as described in claim 5, wherein said ink composition so prepared is a dry composition.

* * * * *